(12) United States Patent
Sakashita

(10) Patent No.: US 8,538,683 B2
(45) Date of Patent: Sep. 17, 2013

(54) HEIGHT OUTPUT DEVICE, HEIGHT OUTPUT METHOD, AND PROGRAM

(75) Inventor: Tatsuya Sakashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 12/944,248

(22) Filed: Nov. 11, 2010

(65) Prior Publication Data

US 2011/0144910 A1 Jun. 16, 2011

(30) Foreign Application Priority Data

Dec. 14, 2009 (JP) .................................. 2009-282458

(51) Int. Cl.
*G01S 5/14* (2006.01)
(52) U.S. Cl.
USPC ............................................ 701/412; 30/281
(58) Field of Classification Search
USPC .................. 701/400, 469, 412; 33/281, 282, 33/285, 290, 293; 342/350, 355, 357.2, 357.36
See application file for complete search history.

(56) References Cited

U.S. PATENT DOCUMENTS 5,265,025 A * 11/1993 Hirata ........................... 701/469
7,692,583 B2 * 4/2010 Watanabe ................ 342/357.29

FOREIGN PATENT DOCUMENTS

JP 2006-214993 8/2006

* cited by examiner

*Primary Examiner* — Dalena Tran
(74) *Attorney, Agent, or Firm* — Oblon, Spivak, McClelland, Maier & Neustadt, L.L.P.

(57) ABSTRACT

A height output device includes a GPS processing unit that calculates a GPS height of a moving body based on GPS signals, an atmospheric pressure measurement unit that measures atmospheric pressure, a determination unit that determines reliability of the GPS height calculated by the GPS processing unit, and an output unit that outputs an absolute height of the moving body depending on the reliability determined by the determination unit. When the reliability satisfies a predetermined output reference, the output unit outputs the latest GPS height calculated by the GPS processing unit, as the absolute height of the moving body, and when the reliability does not satisfy the output reference, the output unit outputs a height, which is calculated by using a past output value of the absolute value and the atmospheric pressure measured by the atmospheric pressure measurement unit, as the absolute height of the moving body.

7 Claims, 9 Drawing Sheets

FIG. 3

| CONDITION | | EVALUATION OF EACH CONDITION | | | |
|---|---|---|---|---|---|
| C1 | 3D POSITIONING IS POSSIBLE | N | Y | Y | Y |
| C2 | RECEPTION STATE OF GPS SIGNALS IS GOOD | – | N | Y | Y |
| C3 | MOVING VELOCITY IS HIGH | – | – | N | Y |
| RELIABILITY | | – | LOW | INTERMEDIATE | HIGH |

Y: DESIGNATED CONDITION IS SATISFIED
N: DESIGNATED CONDITION IS NOT SATISFIED

HEIGHT OUTPUT DEVICE, HEIGHT OUTPUT METHOD, AND PROGRAM

BACKGROUND OF THE INVENTION

1. Field of the Invention

The present invention relates to a height output device, a height output method, and a program.

2. Description of the Related Art

Such navigation device, in related art, that calculates a position of the device based on global positioning system (GPS) signals, which are transmitted from GPS satellites, so as to display the calculated position on a map screen has been widely used. A navigation device is fixedly installed on an automobile or a ship and used in automobile driving or ship handling, for example. Further, a small-sized portable navigation device (PND) is used by a user who moves by bicycle or on foot.

By the way, not only a position of the navigation device but also a height of the navigation device can be calculated based on GPS signals. Positioning in which a height as well as a position of the navigation device are calculated is called three-dimensional (3D) positioning. The 3D positioning is enabled when the navigation device can receive GPS signals from four or more GPS satellites in a case considering error calibration. On the other hand, when the navigation device can receive GPS signals from only three GPS satellites, only a position can be calculated by two-dimensional (2D) positioning.

A height display function is used for informing a present height to a user on a screen of a common car navigation device. In addition, the height display function is very important also for a PND which is taken along by users including travelers and mountain climbers, for example. Therefore, Japanese Unexamined Patent Application Publication No. 2006-214993 proposes a navigation device capable of outputting a height which is determined based on a measurement result of atmospheric pressure when the 3D positioning based on GPS signals is difficult.

SUMMARY OF THE INVENTION

However, in many cases, an error of a height calculated based on GPS signals is larger than an error of a position. The main reason of this is that calculation accuracy in a height direction is compromised because the navigation device widely moves in a planar direction but the device does not move very much in the height direction. When the moving velocity of the navigation device is low, accuracy in calculation of a position and a height tends to be especially degraded. As a result, when a height calculated based on GPS signals is displayed on a screen, even in a case where the 3D positioning is possible, such undesirable phenomenon occurs that a displayed height value varies even though a user stops or horizontally moves. It is favorable to avoid such phenomenon because the user may be eventually confused by the displayed height.

It is desirable to provide novel and improved height output device, height output method, and program that can prevent inappropriate variation of height display obtained by the 3D positioning based on GPS signals.

According to an embodiment of the present invention, there is provided a height output device including a GPS processing unit configured to calculate a GPS height of a moving body based on GPS signals, an atmospheric pressure measurement unit configured to measure atmospheric pressure, a determination unit configured to determine reliability of the GPS height that is calculated by the GPS processing unit, and an output unit configured to output an absolute height of the moving body depending on the reliability that is determined by the determination unit. In a case where the reliability satisfies a predetermined output reference, the output unit outputs the latest GPS height calculated by the GPS processing unit, as the absolute height of the moving body, and in a case where the reliability does not satisfy the output reference, the output unit outputs a height, which is calculated by using a past output value of the absolute value and the atmospheric pressure measured by the atmospheric pressure measurement unit, as the absolute height of the moving body.

The determination unit may determine that the reliability of the GPS height is at any one of a high level and a level other than the high level, depending on signal intensity of the GPS signals and a moving velocity of the moving body, and, in the case, the output reference may be that the reliability of the GPS height is continuously determined to be at the high level for a certain period of time by the determination unit.

In a case where a representing value of the signal intensity of the GPS signals exceeds a predetermined threshold value and a velocity of the moving body exceeds a predetermined threshold value, the determination unit may determine that the reliability of the GPS height is at the high level.

The height output device according to the embodiment of the present invention may further include a difference calculation unit configured to calculate difference of atmospheric pressure, which is measured by the atmospheric pressure measurement unit, from a previous output time point at which a GPS height has been outputted as the absolute value at previous time. In a case where the reliability does not satisfy the output reference, the output unit may output a value, which is obtained by adding a height change amount corresponding to atmospheric pressure difference calculated by the difference calculation unit to an output value of the absolute height at the previous output time point, as the absolute height of the moving body.

In a case where the representing value of the signal intensity of the GPS signals is lower than the predetermined threshold value, the determination unit may determine that the reliability of the GPS height is at a low level, and in a case where the reliability is determined to be at the low level, the output unit may not output the absolute height of the moving body.

According to another embodiment of the present invention, there is provided a height output method including the steps of calculating a GPS height of a moving body based on GPS signals, measuring atmospheric pressure, determining reliability of the GPS height that is calculated, and outputting the latest GPS height that is calculated, as an absolute value of the moving body in a case where the reliability that is determined satisfies a predetermined output reference and outputting a height that is calculated by using a past output value of the absolute height and the atmospheric pressure that is measured, as the absolute height of the moving body in a case where the reliability that is determined does not satisfy the output reference.

According to still another embodiment of the present invention, there is provided a program for allowing a computer that controls a height output device which includes a GPS processing unit configured to calculate a GPS height of a moving body based on GPS signals and an atmospheric pressure measurement unit configured to measure atmospheric pressure, to function as a determination unit configured to determine reliability of the GPS height that is calculated by the GPS processing unit, and an output unit configured to output an absolute height of the moving body depending on the reliability that is determined by the determination unit. In a case where the reliability satisfies a predetermined output reference, the output unit outputs the latest GPS height that is calculated by the GPS processing unit, as an absolute height of the moving body, and in a case where the reliability does not satisfy the output reference, the output unit outputs a height, which is calculated by using a past output value of the absolute height and the atmospheric pressure that is calculated by the atmospheric pressure measurement unit, as the absolute height of the moving body.

As described above, according to the height output device, the height output method, and the program of the embodiments of the present invention, an inappropriate display variation of a height obtained by the 3D positioning based on GPS signals can be prevented.

BRIEF DESCRIPTION OF THE DRAWINGS

FIG. 3 illustrates reliability which is determined by the height output device according to the embodiment of the present invention;

DESCRIPTION OF THE PREFERRED EMBODIMENTS

Figure 1:
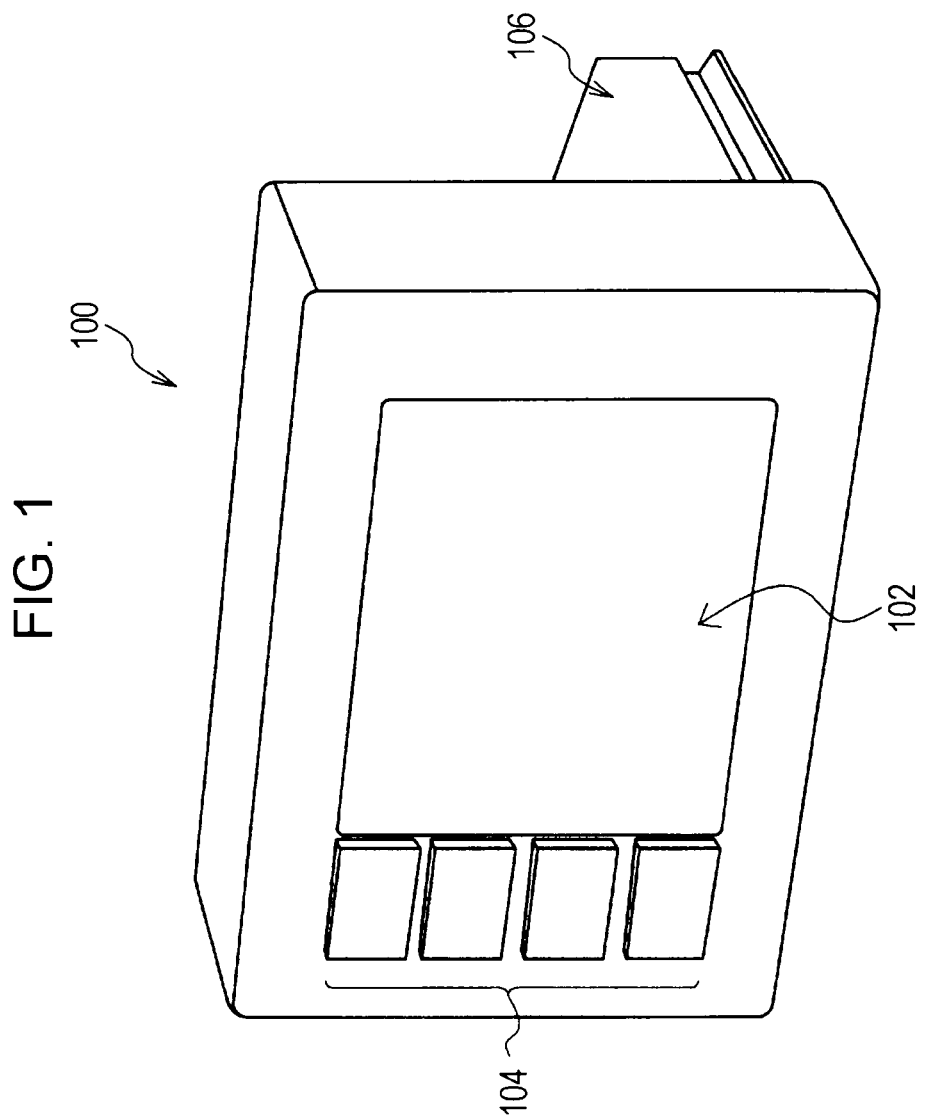
FIG. 1 schematically illustrates an external appearance of a height output device according to an embodiment of the present invention.

A preferred embodiment of the present invention will be described in detail below with reference to the accompanying drawings. In the specification and drawings, elements substantively having the identical functional configuration will be given the same reference character so as to omit duplicative descriptions thereof.

The embodiment of the present invention is described in the following order.

1. Brief Overview of Height Output Device
2. Configuration Example of Height Output Device According to the Embodiment
3. Processing Flow According to the Embodiment
4. Summary 1. Brief Overview of Height Output Device A brief overview of a height output device is first described with reference to FIG. 1. FIG. 1 schematically illustrates an exterior appearance of a height output device 100 according to the embodiment of the present invention. Referring to FIG. 1, the height output device 100 includes a display unit 102 and an operation unit 104 which are provided on a front surface of the device. Further, the height output device 100 is connected with a cradle 106.

The display unit 102 is a liquid crystal display (LCD) or an organic light-emitting diode (O-LED) display, for example. The display unit 102 displays an output image which is produced based on map data, positional data, and height data, on a screen, for example. The map data is stored in a storage medium (not shown) which is provided inside the height output device 100. The positional data and the height data will be described later.

The operation unit 104 is a unit at which the height output device 100 receives a user input. The operation unit 104 may be a physical input unit such as a button, a switch, a dial, and a lever, for example. Alternatively, the operation unit 104 may be mounted as a graphical user interface (GUI) which is displayed on the display unit 102 having a touch panel function, for example. Further, the operation unit 104 may be a remote controller which is structured as a separate body independent from the body of the height output device 100 shown in FIG. 1.

The cradle 106 is connected with the height output device 100 when the height output device 100 is fixed on a vehicle, for example. The cradle 106 may supply electric power which is supplied from a battery of the vehicle to the height output device 100, for example. In a case where the height output device 100 is used as a PND, the height output device 100 may be taken along by a user in a manner to be unconnected with the cradle 106. In this case, the height output device 100 is supplied with electric power from a battery (not shown) which is housed therein.

As described above, the height output device 100 may be a stationary navigation device or may be a PND which can be taken along by a user. Further, an example in which the height output device 100 is a navigation device is described in this specification, but the embodiment of the present invention is applicable to various types of devices other than the navigation device. For example, the embodiment of the present invention may be applied to a height output dedicated device which displays only a height of a moving body without displaying a position of the moving body, or a height output module which is built in these devices.

2. Configuration Example of Height Output Device According to the Embodiment

Figure 2:
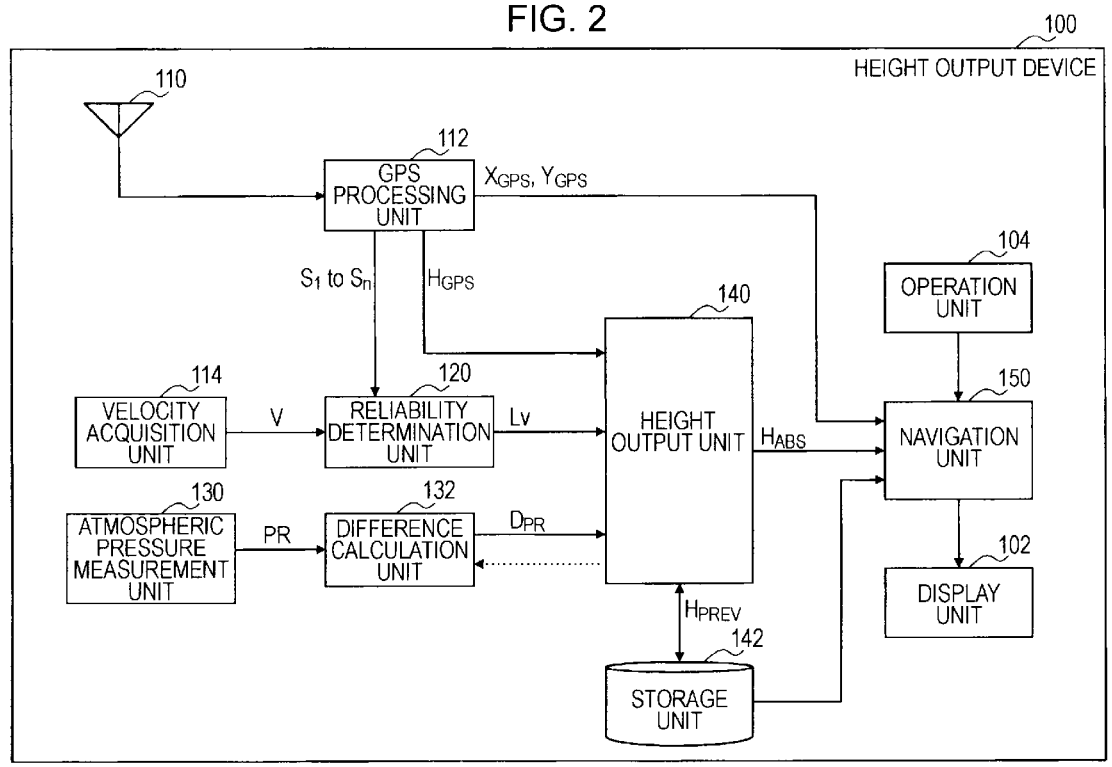
FIG. 2 is a block diagram showing an example of the configuration of the height output device according to the embodiment of the present invention.

FIG. 2 is a block diagram showing an example of the configuration of the height output device 100 shown in FIG. 1. Referring to FIG. 2, the height output device 100 includes the display unit 102, the operation unit 104, a GPS antenna 110, a GPS processing unit 112, a velocity acquisition unit 114, a reliability determination unit 120, an atmospheric pressure measurement unit 130, a difference calculation unit 132, a height output unit 140, a storage unit 142, and a navigation unit 150.

(GPS Antenna)

The GPS antenna 110 receives GPS signals transmitted from a plurality of GPS satellites. In each of the GPS signals, identification data, time data, orbit data, and the like of the GPS satellite which transmits the GPS signal are modulated. Then, the GPS antenna 110 outputs each of the received GPS signals to the GPS processing unit 112.

(GPS Processing Unit)

The GPS processing unit 112 demodulates the GPS signals received from the GPS antenna 110 so as to acquire the identification data, the time data, the orbit data, and the like of the GPS satellites described above. Then, the GPS processing unit 112 calculates a latitude and a longitude, or a latitude, a longitude, and a height based on the acquired data. For example, in a case where the GPS antenna 110 receives GPS signals from three GPS satellites, two-dimensional (2D) positioning is possible. In this case, the GPS processing unit 112 can calculate a latitude and a longitude of the moving body, that is, a two-dimensional position of the moving body. In a case where the GPS antenna 110 receives GPS signals from four or more GPS satellites, the 3D positioning is possible. In this case, the GPS processing unit 112 calculates a height as well as a two-dimensional position of the moving body. In this specification, a height of the moving body which is calculated by the GPS processing unit 112 based on GPS signals is referred to as a GPS height. Here, the height of the moving body corresponds to a height at which a vehicle or a vessel on which the height output device 100 is installed is positioned, or a height at which a user taking along the height output device 100 is positioned, for example (substantively indicates a height at which the GPS antenna 110 is positioned). The GPS processing unit 112 outputs a GPS height $H_{GPS}$, which is calculated as above, of the moving body to the height output unit 140. Further, the GPS processing unit 112 outputs a latitude $X_{GPS}$ and a longitude $Y_{GPS}$ of the moving body to the navigation unit 150.

Further, the GPS processing unit 112 measures signal intensity (received signal intensity) of each of the GPS signals received from the GPS antenna 110. When a reception state of a GPS signal is good, that is, when any object blocking a signal does not exist between the GPS antenna 110 and a GPS satellite, or when a noise is small, for example, the signal intensity of the GPS signal has a large value. The GPS processing unit 112 outputs measured signal intensity $S_1$ to $S_n$ (a small characteristic corresponds to each individual GPS satellite) of respective GPS signals to the reliability determination unit 120.

(Velocity Acquisition Unit)

The velocity acquisition unit 114 acquires a moving velocity of the moving body. The velocity acquisition unit 114 may calculate a moving velocity of the moving body depending on changes of the latitude and the longitude of the moving body which are calculated by the GPS processing unit 112 based on the GPS signals, for example. Alternatively, the velocity acquisition unit 114 may acquire the velocity of the moving body by detecting acceleration of the moving body with a triaxial acceleration sensor and integrating the detected acceleration, for example. Further, in a case where the moving body is a vehicle, for example, the velocity acquisition unit 114 may acquire a velocity which is measured by a velocity meter of the vehicle. The velocity acquisition unit 114 outputs a moving velocity V acquired as above to the reliability determination unit 120.

(Reliability Determination Unit)

The reliability determination unit 120 determines reliability of the GPS height, which is calculated by the GPS processing unit 112, depending on the signal intensity $S_1$ to $S_n$ of the GPS signals received from the GPS processing unit 112 and the moving velocity V received from the velocity acquisition unit 114.

FIG. 3 illustrates reliability which is determined by the reliability determination unit 120. Three conditions C1, C2, and C3 for determining reliability are shown on the second to fourth rows of FIG. 3. Further, reliability determination results based on evaluations of whether the conditions are satisfied are shown on the fifth row of FIG. 3.

First, the first condition C1 is whether the 3D positioning is possible. For example, when GPS signals having enough signal intensity to be used for the 3D positioning can be received from four or more GPS satellites, the 3D positioning is possible. When the 3D positioning is not possible, a GPS height is not calculated by the GPS processing unit 112. Therefore, the reliability determination unit 120 has no necessity to determine reliability.

The second condition C2 is whether the reception state of the GPS signals is good. For example, when a representing value of the signal intensity of the GPS signals exceeds a predetermined threshold value, it can be considered that the reception state of the GPS signals is good. The representing value of the signal intensity of the GPS signals may be an average value, a minimum value, or the like of the signal intensity of the GPS signals from GPS satellites of the number corresponding to the number of the GPS signals that are used for the calculation processing of the GPS height by the GPS processing unit 112, for example. Namely, in a case where the GPS processing unit 112 uses GPS signals from six GPS satellites for the calculation processing of a GPS height, for example, a representing value (an average value, a minimum value, or the like) of signal intensity of the GPS signals from the six GPS satellites is compared with the threshold value.

The third condition C3 is whether the moving velocity of the moving body is high. For example, in a case where the moving velocity V inputted from the velocity acquisition unit 114 exceeds a predetermined threshold value (for example, 4 km/h), it is determined that the moving velocity of the moving body is high.

The reliability determination unit 120 classifies the reliability of the GPS height calculated by the GPS processing unit 112 into three levels of "high", "intermediate", and "low" by using these three conditions (especially, conditions C2 and C3). For example, in a case where the 3D positioning is possible (condition C1 is satisfied) and the reception state of the GPS signals is not good (condition C2 is not satisfied), the reliability determination unit 120 determines that the reliability is at a low level. In a case where the 3D positioning is possible, further, reception state of the GPS signals is good (condition C2 is satisfied), and the moving velocity is not high (condition C3 is not satisfied), the reliability determination unit 120 determines that the reliability is at an intermediate level. Further, in a case where the 3D positioning is possible, the reception state of the GPS signals is good, and the moving velocity is high (condition C3 is satisfied), the reliability determination unit 120 determines that the reliability is at a high level.

The reliability determination unit 120 outputs reliability Lv (Lv="high", "intermediate", or "low") of the GPS height determined as above to the height output unit 140.

(Atmospheric Pressure Measurement Unit)

The atmospheric pressure measurement unit 130 measures atmospheric pressure PR around the moving body with a capacitance atmospheric-pressure sensor, for example. Then, the atmospheric pressure measurement unit 130 outputs the measured atmospheric pressure PR to the difference calculation unit 132.

(Difference Calculation Unit)

The difference calculation unit 132 calculates difference $D_{PR}$ of the atmospheric pressure PR, which is measured by the atmospheric pressure measurement unit 130, from a previous output time point at which a GPS height has been outputted by the height output unit 140 as an absolute height. More specifically, for example, the difference calculation unit 132 temporarily holds a value of the atmospheric pressure PR which is received from the atmospheric pressure measurement unit 130 (such a value is denoted as $PR_{PREV}$) at an output time point which is informed by the height output unit 140. Then, the difference calculation unit 132 deducts the value $PR_{PREV}$, which is temporarily held, from the atmospheric pressure PR which is measured by the atmospheric pressure measurement unit 130 at a constant sampling frequency. Accordingly, difference $D_{PR}$ ($D_{PR}=PR-PR_{PREV}$) is calculated. The difference calculation unit 132 outputs the atmospheric pressure difference $D_{PR}$ which is calculated as above to the height output unit 140.

(Height Output Unit)

The height output unit 140 outputs an absolute height of the moving body to the navigation unit 150 depending on reliability of the GPS height which is determined by the reliability determination unit 120. More specifically, in a case where reliability Lv of a GPS height which is inputted from the reliability determination unit 120 satisfies a predetermined output reference, the height output unit 140 outputs the latest GPS height $H_{GPS}$ which is calculated by the GPS processing unit 112, as an absolute height $H_{ABS}$ of the moving body. In a case where the reliability Lv does not satisfy the above-described output reference, the height output unit 140 outputs a height which is calculated by using a past output value $H_{PREV}$ of the absolute value and the atmospheric pressure difference $D_{PR}$ received from the difference calculation unit 132, as the absolute height $H_{ABS}$ of the moving body. Here, the past output value $H_{PREV}$ of the absolute value which is used in the embodiment of the present invention denotes a GPS height value outputted from the height output unit 140 as a previous absolute height.

The above-mentioned output reference which is a determination reference of whether the height output unit 140 outputs the latest GPS height $H_{GPS}$ as the absolute height $H_{ABS}$ of the moving body may be that the reliability Lv of the GPS height is continuously determined to be at a high level for a predetermined period of time, for example. The predetermined period of time can be selected, for example, from a range from several seconds to several tens of seconds (may be 20 seconds, for example). That is, when such state that the 3D positioning is possible, the reception state of the GPS signals is good, and the moving velocity of the moving body is high continues for a predetermined period of time, the height output unit 140 outputs the latest GPS height $H_{GPS}$ as the absolute height $H_{ABS}$ of the moving body. In this case, the calculation processing of the GPS height is maintained high accuracy. Accordingly, even though the GPS height is displayed on a screen as it is, the displayed value unlikely varies inappropriately. On the other hand, when the above-described output reference is not satisfied, the height output unit 140 performs height calculation processing based on atmospheric pressure difference and outputs the resulting height as the absolute height $H_{ABS}$ of the moving body.

Figure 4:
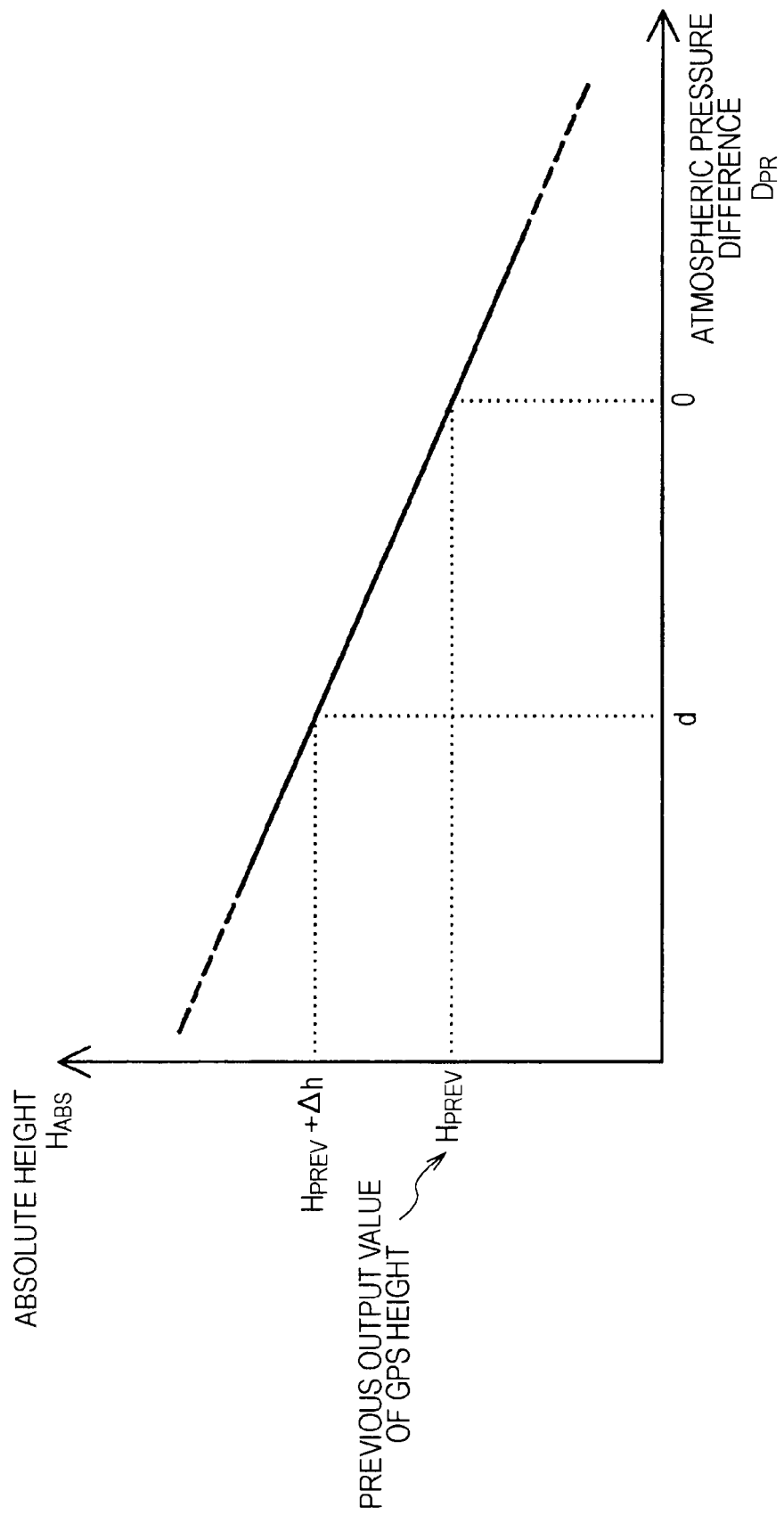
FIG. 4 illustrates an example of height calculation processing based on atmospheric pressure difference.

FIG. 4 illustrates an example of the height calculation processing based on atmospheric pressure difference. FIG. 4 shows a graph showing a relationship on a coordinate system between the atmospheric pressure difference $D_{PR}$, which is shown on a horizontal axis, and the absolute height $H_{ABS}$, which is shown on a vertical axis.

In general, when the height increases by 10 m near the surface of the ground under a constant temperature, the atmospheric pressure decreases about 1 hPa. Therefore, according to the simplest model, the relationship between the atmospheric pressure difference $D_{PR}$ and the height output value $H_{ABS}$ can be expressed as a linear function having the gradient of −10 m per +1 hPa. This linear function passes through a point on which the absolute height $H_{ABS}=H_{PREV}$ is satisfied when $D_{PR}=0$, as shown in FIG. 4. $H_{PREV}$ denotes a GPS height value which has been outputted at previous time as the absolute height. Accordingly, the height output unit 140 can determine the absolute height $H_{ABS}$ which is to be outputted, by using the previous output value $H_{PREV}$ of a GPS height and the atmospheric pressure difference $D_{PR}$ from the output time point of the designated output value. For example, in the example of FIG. 4, when the atmospheric pressure difference $D_{PR}=d$, a value $H_{PREV}+\Delta h$ which is obtained by adding a height change amount $\Delta h$ corresponding to the atmospheric pressure difference $D_{PR}=d$ to the previous output value $H_{PREV}$, can be determined as the absolute height $H_{ABS}$ which is to be outputted.

A parameter defining such model (the gradient of the linear function described above, for example) is preliminarily stored in the storage medium which is built in the height output device 100. Here, the model defining the relationship between the atmospheric pressure difference and the height output value is not limited to the simple linear function model described with reference to FIG. 4. When the height output device 100 includes a temperature sensor, an absolute value which is to be outputted may be determined depending on the temperature change as well as the atmospheric pressure change.

Thus, the height output unit 140 outputs the latest GPS height or the height calculated by using the previous output value of the GPS height and the atmospheric pressure difference to the navigation unit 150 as the absolute height of the moving body, depending on reliability of the GPS height. Such processing is repeatedly performed in a cycle of one second, for example. Further, when the height output unit 140 outputs the latest GPS height to the navigation unit 150, the height output unit 140 informs the output time point to the difference calculation unit 132 and allows the storage unit 142 to store the output value $H_{PREV}$ of the GPS height.

(Storage Unit)

The storage unit 142 stores the output value $H_{PREV}$ of the GPS height received from the height output unit 140 by using a storage medium such as a hard disc and a semiconductor memory. The storage unit 142 may store a parameter, which defines a model expressing a relationship between the atmospheric pressure difference and the height output value, for the absolute value calculation, for example. Further, the storage unit 142 may store a threshold value which is used for the reliability determination processing by the reliability determination unit 120 (for example, a threshold value which is compared to a representing value of signal intensity of GPS signals, and a threshold value which is compared to the moving velocity of the moving body). Furthermore, the storage unit 142 preliminarily stores the map data which is used by the navigation unit 150 described below.

(Navigation Unit)

The navigation unit 150 produces an output image which is to be displayed on the screen by using the latitude $X_{GPS}$ and the longitude $Y_{GPS}$ which are received from the GPS processing unit 112, the absolute height $H_{ABS}$ of the moving body which is received from the height output unit 140, and the map data which is stored in the storage unit 142.

Figure 5:
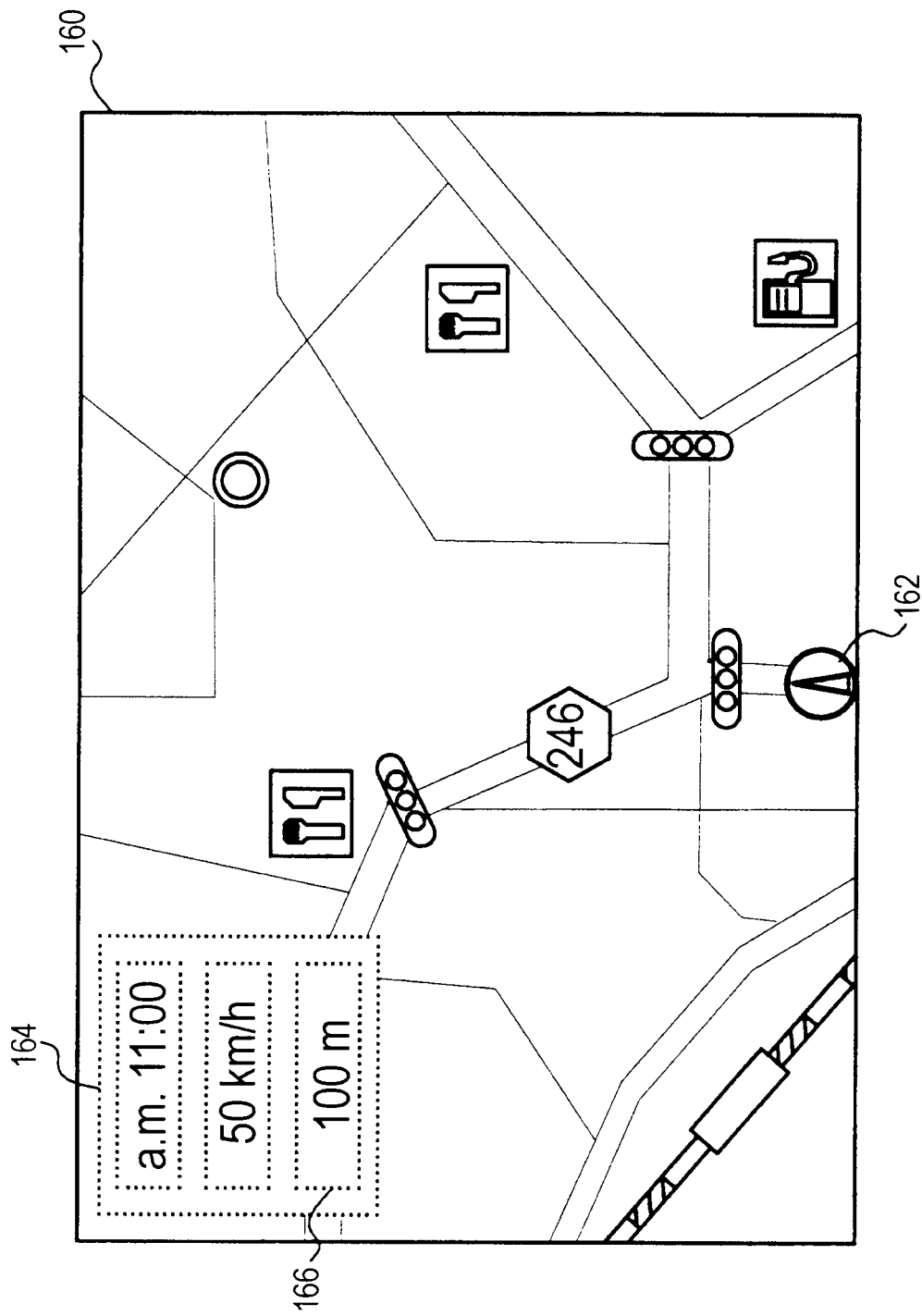
FIG. 5 illustrates an example of an output image which is displayed on a screen of the height output device according to the embodiment of the present invention.

FIG. 5 illustrates an example of the output image produced by the navigation unit 150. FIG. 5 shows an output image 160 which is an example produced by the navigation unit 150 and displayed on the display unit 102.

The output image 160 is produced by superimposing a present-position mark 162 showing a present position and an information display region 164 on a map image around the present position on which the moving body is positioned. In the example of FIG. 5, a present height 166 ("100 m") as well as present time ("a.m. 11:00") and a moving velocity ("50 km/h") is displayed in the information display region 164. These information are periodically updated, for example, in synchronization with an output cycle of the height output unit 140 (a cycle of one second, for example). Accordingly, the navigation unit 150 can display a GPS height with less error when the reliability of the GPS height is at a high level, or a height which is calculated depending on the atmospheric pressure difference having less temporal variation when the reliability of the GPS height is not at the high level, on the screen as the present height.

Here, an additional mark may be displayed in the output image 160. The additional mark is used for recognizing whether the present height 166 shows the GPS height itself or the height calculated depending on the atmospheric pressure difference. Further, an indicator showing the reliability of the GPS height which is determined by the reliability determination unit 120 may be additionally displayed.

Figure 6:
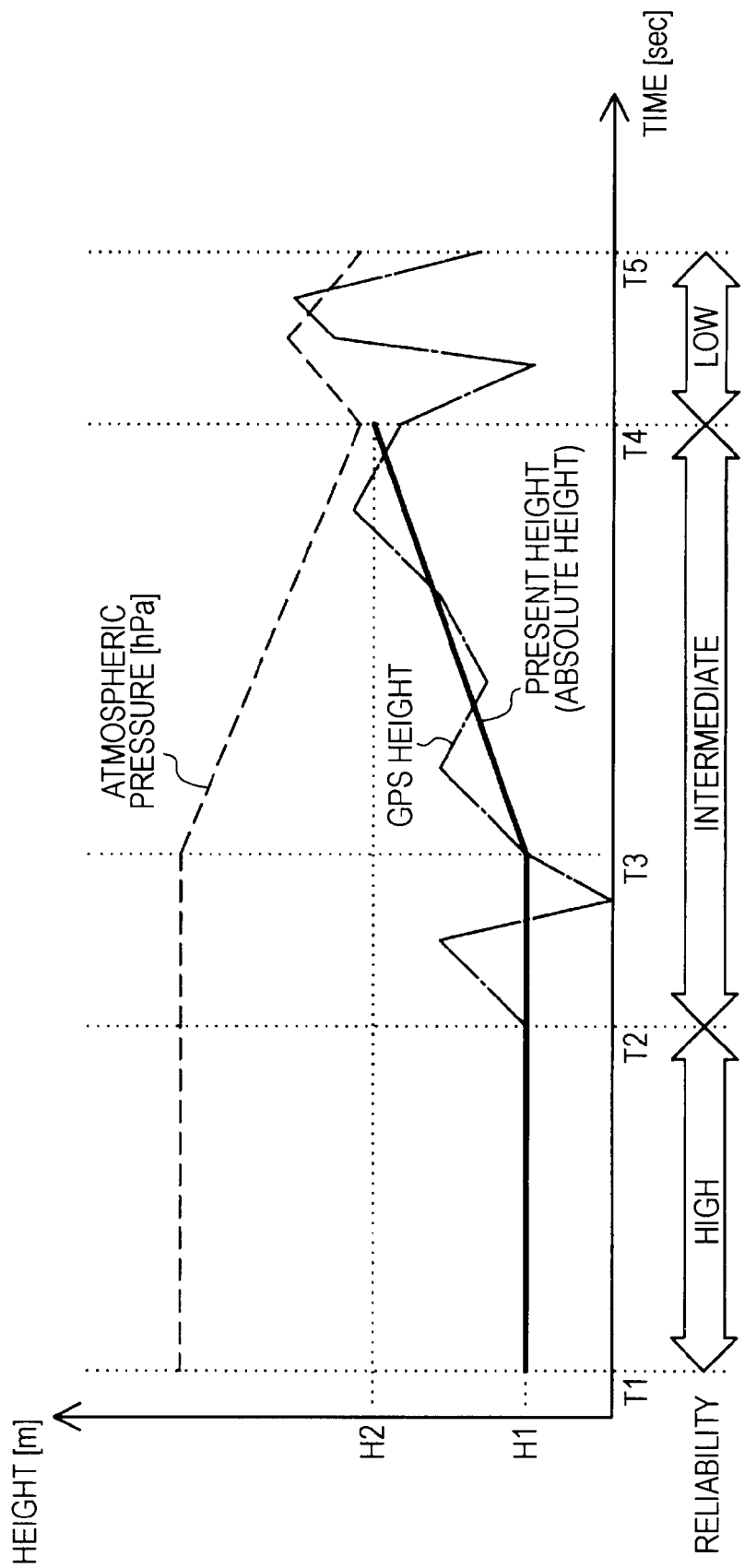
FIG. 6 is a graph showing an example of value changes of an absolute value and a GPS height which are outputted in the height output device according to the embodiment of the present invention.

FIG. 6 is a graph showing an example of changes of the present height (absolute height) displayed in the output image 160 and the GPS height value calculated by the GPS processing unit 112, in the embodiment of the present invention. Referring to FIG. 6, the present height [m] displayed in the output image 160 is expressed by a bold line, the GPS height [m] calculated by the GPS processing unit 112 is expressed by a dashed-dotted line, and the atmospheric pressure [hPa] measured by the atmospheric pressure measurement unit 130 is expressed by a dashed line. The horizontal axis of the graph shows time [sec]. Below the horizontal axis of the graph, the reliability of the GPS height determined by the reliability determination unit 120 at each time point is shown.

In the example of FIG. 6, it is determined that the reliability of the GPS height is at the high level from time T1 to time T2. A value of the GPS height is H1. In this case, a value of the present height is same as the value of the GPS height, that is, H1.

Next, it is determined that the reliability of the GPS height is at the intermediate level from time T2 to time T4. For example, an error included in the GPS height during this period becomes relatively large due to lowered velocity, for example. As a result, variation of the value of the GPS height from time T2 to time T4 is larger than variation from time T1 to time T2. In this case, the present height is a value calculated based on the value of the present height at time T2 and atmospheric pressure difference from time T2. In the example of FIG. 6, the atmospheric pressure is constant from time T2 to time T3. The atmospheric pressure gradually decreased from time T3 to time T4. As a result, the present height does not vary to remain at H1 from time T2 to time T3, and gradually increases from H1 to H2 from time T3 to time T4.

Next, it is determined that the reliability of the GPS height is at the low level from time T4 to time T5. For example, an error included in the GPS height during this period becomes extremely large because the moving body enters a tunnel or a building, for example. Under such situation, a measurement value of the atmospheric pressure may largely vary due to an influence of factors other than the height. Therefore, the present height is not displayed while the reliability of the GPS height is at the low level so as not to confuse a user. FIG. 6 does not show a bold line expressing the present height from time T4 to time T5. After that, when the reliability of the GPS recovers to the high level or the intermediate level, the display of the present height is also resumed.

3. Processing Flow According to the Embodiment

A processing flow of the height output device 100 according to the embodiment of the present invention is described below with reference to a flowchart.

(Reliability Determination Processing)

Figure 7:
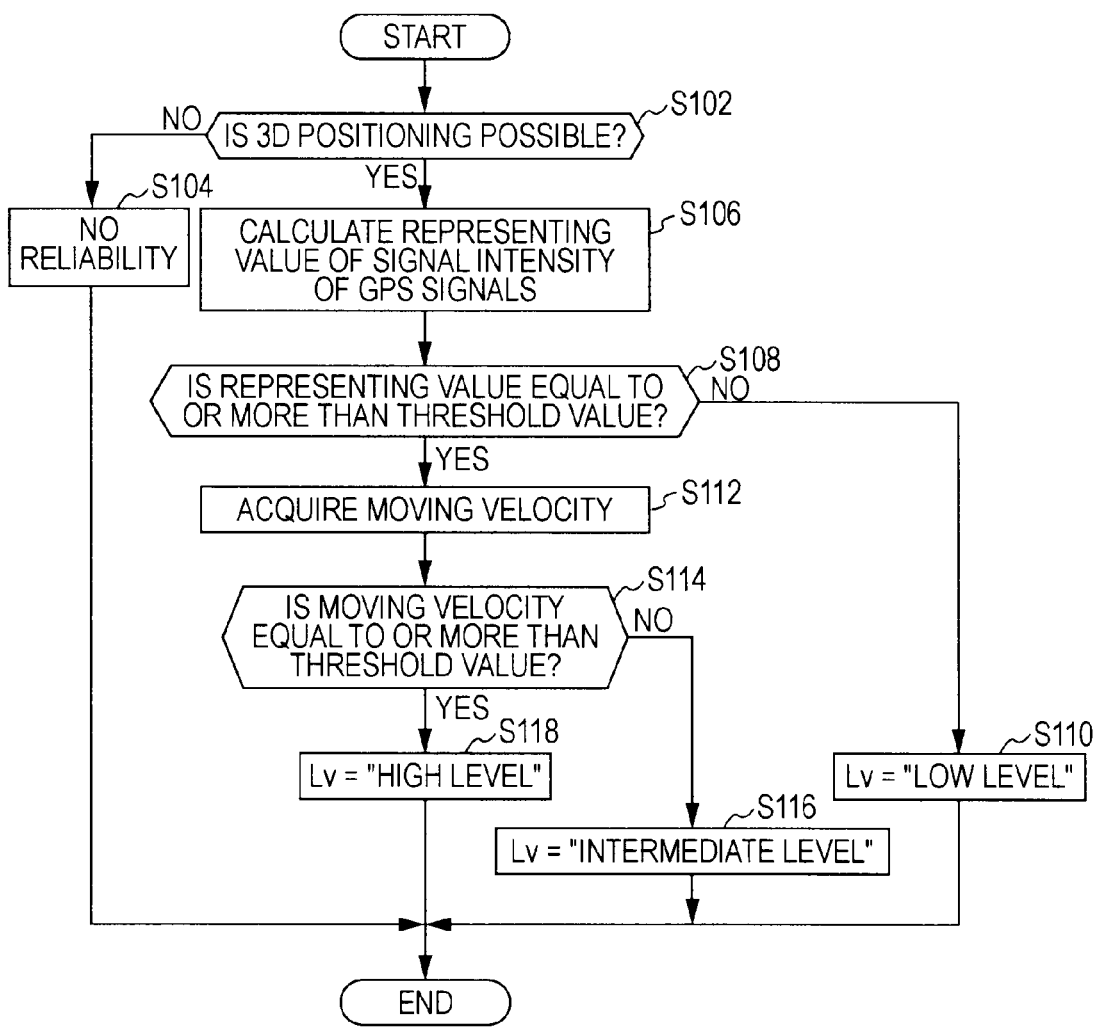
FIG. 7 is a flowchart showing an example of a flow of reliability determination processing according to the embodiment of the invention.

FIG. 7 is a flowchart showing an example of a flow of the reliability determination processing by the reliability determination unit 120 of the height output device 100.

Referring to FIG. 7, the reliability determination unit 120 first determines whether the 3D positioning is possible (step S102). When GPS signals respectively having enough signal intensity to be used for the 3D positioning can be received from four or more GPS satellites, for example, the reliability determination unit 120 can determine that the 3D positioning is possible. When it is determined that the 3D positioning is not possible, the processing goes to step S104. In this case, since a GPS height itself is not calculated, reliability is not determined (step S104). On the other hand, when it is determined that the 3D positioning is possible, the processing goes to step S106.

Next, the reliability determination unit 120 calculates a representing value of signal intensity of the GPS signals. For example, when GPS signals from six GPS satellites are received, the reliability determination unit 120 can calculate an average value or a minimum value of signal intensity $S_1$ to $S_6$ of the GPS signals as the representing value of the signal intensity. Then, the reliability determination unit 120 compares the calculated representing value to a predetermined threshold value (step S108). When the representing value is less than the threshold value, for example, the processing goes to step S110. In this case, the reliability determination unit 120 determines that the reliability Lv of the GPS height is at the "low level" (step S110). On the other hand, when the representing value is equal to or more than the threshold value, the processing goes to step S112.

Next, the reliability determination unit 120 acquires a moving velocity of the moving body which is received from the velocity acquisition unit 114 (step S112). Then, the reliability determination unit 120 compares the acquired moving velocity to a predetermined threshold value (step S114). When the moving velocity is less than the threshold value, for example, the processing goes to step S116. In this case, the reliability determination unit 120 determines that the reliability Lv of the GPS height is at the "intermediate level" (step S116). On the other hand, when the moving velocity is equal to or more than the threshold value, the reliability determination unit 120 determines that the reliability Lv of the GPS height is at the "high level" (step S118). Then, the reliability determination processing by the reliability determination unit 120 is ended.

(Height Output Processing)

Figure 8A:
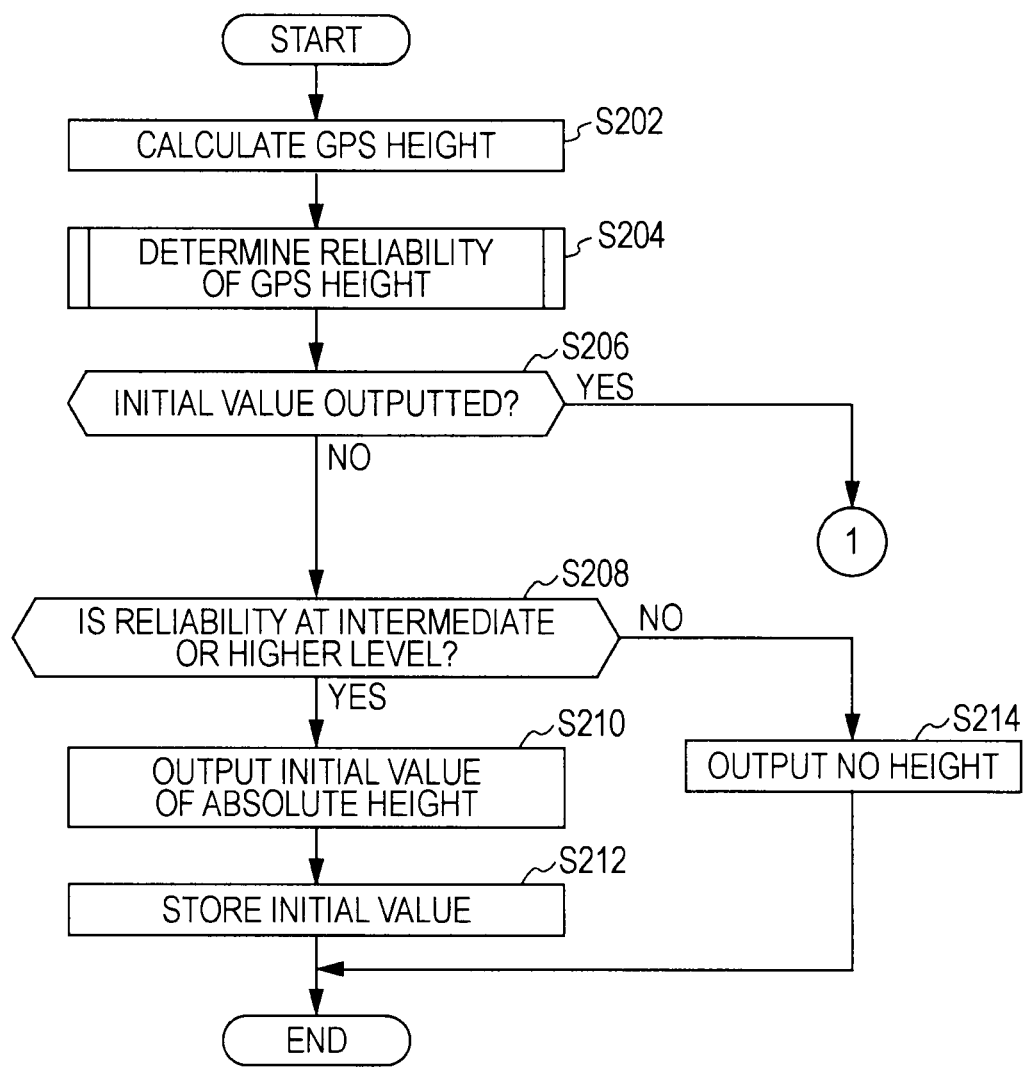
FIG. 8A is a flowchart showing an example of a first half flow of height output processing according to the embodiment of the present invention.
Figure 8B:
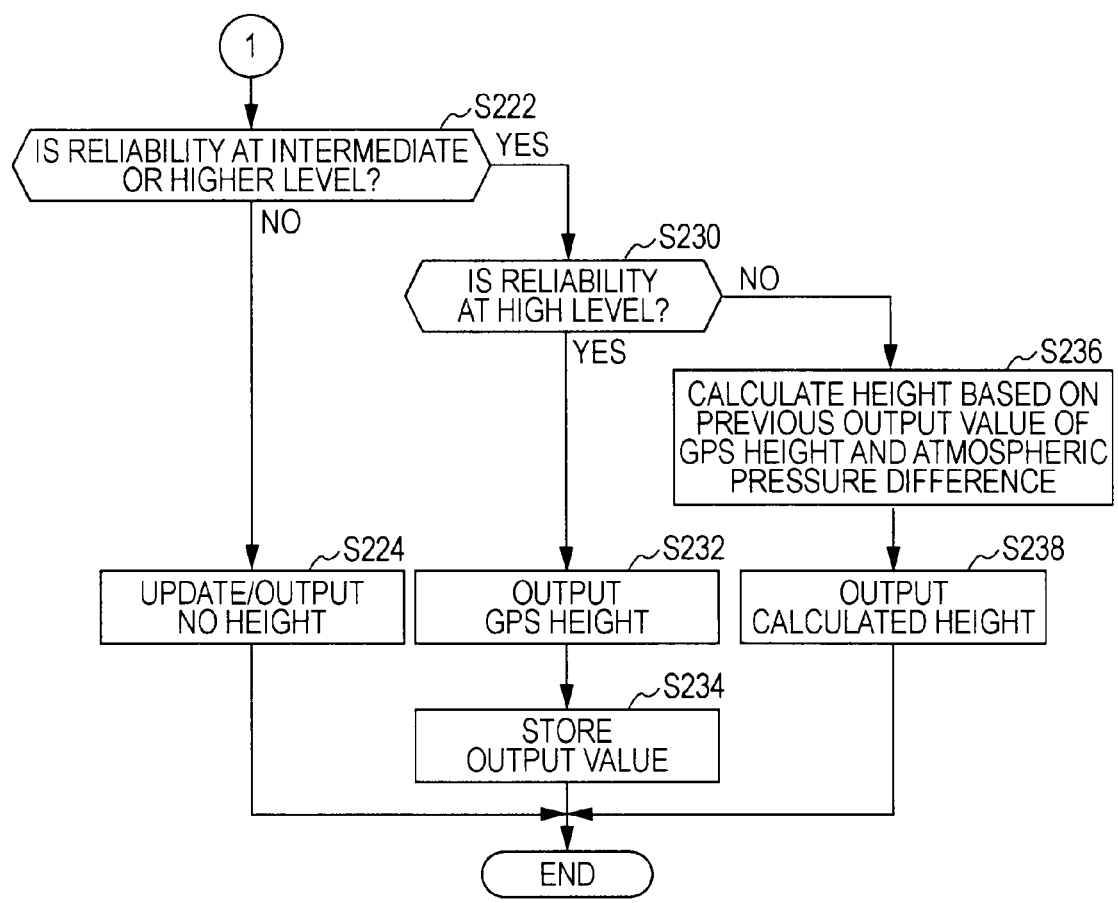
FIG. 8B is a flowchart showing an example of a second half flow of the height output processing according to the embodiment of the present invention.

FIGS. 8A and 8B are flowcharts showing an example of the height output processing by the height output device 100.

Referring to FIG. 8A, the GPS processing unit 112 calculates a GPS height based on GPS signals (step S202). The GPS height calculated by the GPS processing unit 112 is inputted into the height output unit 140. Further, the reliability determination unit 120 performs the reliability determination processing which is described with reference to FIG. 7 (step S204). The reliability of the GPS height determined by the reliability determination unit 120 is inputted into the height output unit 140.

Then, the height output processing branches depending on whether an initial value has been outputted (step S206). When the initial value has been outputted, the processing goes to step S222 of FIG. 8B. On the other hand, when the initial value has not been outputted, the processing goes to step S208.

In step S208, the height output unit 140 determines whether the reliability of the GPS height is at the intermediate or higher level (step S208). Here, when the reliability of the GPS height is at the intermediate or higher level, the processing goes to step S210. On the other hand, when the reliability of the GPS height is not at the intermediate or higher level, the processing goes to step S214.

In step S210, the height output unit 140 outputs the GPS height calculated by the GPS processing unit 112 to the navigation unit 150 as the initial value of the absolute value (step S210). Further, the height output unit 140 allows the storage unit 142 to store the initial value (step S212). In step S214, since the reliability of the GPS height is not at the intermediate or higher level, the height output unit 140 does not output the absolute height to the navigation unit 150 (step S214).

Next, referring to FIG. 8B, in a case where the initial value has been outputted, the height output unit 140 determines whether the reliability of the GPS height is at the intermediate or higher level (step S222). Here, when the reliability of the GPS height is at the intermediate or higher level, the processing goes to step S230. On the other hand, when the reliability of the GPS height is not at the intermediate or higher level, the processing goes to step S224.

In step S224, since the reliability of the GPS height is not at the intermediate or higher level, the height output unit 140 does not update the absolute value or does not output the absolute value to the navigation unit 150 (step S224). When the reliability of the GPS height is at the low level, the height output unit 140 does not update the absolute value and may output the same value as the previous output value to the navigation unit 150, for example. Further, when it is not possible to calculate the GPS height and to determine the reliability, for example, the height output unit 140 does not have necessity to output the absolute height to the navigation unit 150.

On the other hand, in step S230, the height output unit 140 determines whether the reliability of the GPS height is at the high level (step S230). When the reliability of the GPS height is at the high level, the processing goes to step S232. In this case, the height output unit 140 outputs the GPS height to the navigation unit 150 as the absolute height of the moving body (step S232) and, at the same time, allows the storage unit 142 to store the output value of the GPS height (step S234). On the other hand, when the reliability of the GPS height is not at the high level, the processing goes to step S236.

In step S236, the height output unit 140 calculates an absolute value of the moving body based on an output value of a previous GPS height stored in the storage unit 142 and atmospheric pressure difference calculated by the difference calculation unit 132 (step S236). Then, the height output unit 140 outputs the calculated absolute value to the navigation unit 150 (step S238).

Such the height output processing by the height output device 100 is repeatedly performed in a cycle of one second as described above. Accordingly, stable height display described with reference to FIG. 6, that is, height display which does not largely vary due to an influence of an error of the GPS height can be realized.

4. Summary

The height output device 100 according to the embodiment of the present invention has been described thus far with reference to FIGS. 1 to 8B. According to the embodiment, when reliability of a GPS height satisfies a predetermined output reference, the latest GPS height calculated based on GPS signals is outputted as an absolute height of a moving body. When the reliability of the GPS height does not satisfy the output reference, a height calculated by using a past output value of the absolute value and a measurement value of atmospheric pressure, as the absolute value of the moving body. Therefore, even in a case where the 3D positioning is possible but an error of the GPS height is large due to an inferior reception state of the GPS signals, a low moving velocity, and the like, such a phenomenon that an output value of the absolute value inappropriately varies is suppressed. Such advantageous effect can be realized in that atmospheric pressure around the moving body hardly varies in a short time due to factors other than a height change, under normal weather.

In the embodiment, the output reference regarding the reliability of the GPS height is that the reliability of the GPS height is continuously determined to be at the high level for a certain period of time. Accordingly, when the GPS height is stabilized at high accuracy, the GPS height having high accuracy can be preferentially outputted.

In the embodiment, when a representing value of signal intensity of GPS signals from a plurality of GPS satellites exceeds a predetermined threshold value and a moving velocity of the moving body exceeds a predetermined threshold value, it is determined that the reliability of the GPS height is at the high level. Accordingly, when the reception state of the GPS signals is not good, or when the moving velocity of the moving body is low, it is not determined that the reliability is at the high level. Therefore, an absolute height which is based on atmospheric pressure having a more stable value can be outputted.

In the embodiment, the absolute height based on the atmospheric pressure change is calculated by adding a height change amount corresponding to the atmospheric pressure difference from a previous output time point at which a GPS height has been outputted as an absolute height, to an output value of the absolute height at the designated time point. Accordingly, the height output device 100 according to the embodiment having the simple configuration in which a GPS antenna, an atmospheric pressure sensor, and common processing device and storage medium are used can be mounted.

In the embodiment, when the representing value of the signal intensity of the GPS signals is lower than the predetermined threshold value, it is determined that the reliability of the GPS height is at the low level and the absolute value of the moving body is not outputted. Accordingly, in a case where the reception state of the GPS signals is deteriorated and the atmospheric pressure is easily influenced by factors other than the height due to entrance of the moving body to a tunnel or a building, an inappropriate height output and resulting users' confusion are prevented.

Here, the series of the processing described in this specification may be realized by hardware or software. When the series of the processing or a part of the processing is performed by software, a program constituting the software is preliminarily stored in a storage medium such as a hard disc and a semiconductor memory. Then, after the program is read into a random access memory (RAM), the program is performed with a processing device such as a central processing unit (CPU).

The present application contains subject matter related to that disclosed in Japanese Priority Patent Application JP 2009-282458 filed in the Japan Patent Office on Dec. 14, 2009, the entire contents of which are hereby incorporated by reference.

The preferred embodiment of the present invention has been described in detail thus far with reference to the accompanying drawings, but the embodiment of the present invention is not limited to the above example. It is apparent for those skilled in the art to which the present invention belongs to reach various modifications and alterations within the scope of the technical idea according to the embodiment of the present invention, and it should be understood that these modifications and alterations are obviously within the technical scope of the present invention.

What is claimed is:

1. A height output device, comprising:
 a GPS processing unit configured to calculate a GPS height of a moving body based on GPS signals;
 an atmospheric pressure measurement unit configured to measure atmospheric pressure;
 a determination unit configured to determine reliability of the GPS height that is calculated by the GPS processing unit; and
 an output unit configured to output an absolute height of the moving body depending on the reliability that is determined by the determination unit; wherein
 in a case where the reliability satisfies a predetermined output reference, the output unit outputs a latest GPS height calculated by the GPS processing unit, as the absolute height of the moving body, and in a case where the reliability does not satisfy the output reference, the output unit outputs a height, the height being calculated by using a past output value of the absolute value and the atmospheric pressure measured by the atmospheric pressure measurement unit, as the absolute height of the moving body.

2. The height output device according to claim 1, wherein the determination unit determines that the reliability of the GPS height is at any one of a high level and a level other than the high level, depending on signal intensity of the GPS signals and a moving velocity of the moving body, and
 the output reference is that the reliability of the GPS height is continuously determined to be at the high level for a certain period of time by the determination unit.

3. The height output device according to claim 2, wherein in a case where a representing value of the signal intensity of the GPS signals exceeds a predetermined threshold value and a velocity of the moving body exceeds a predetermined threshold value, the determination unit determines that the reliability of the GPS height is at the high level.

4. The height output device according to any one of claims 1 to 3, further comprising:
 a difference calculation unit configured to calculate difference of atmospheric pressure, the atmospheric pressure being measured by the atmospheric pressure measurement unit, from a previous output time point at which a GPS height has been outputted as the absolute value at previous time; wherein
 in a case where the reliability does not satisfy the output reference, the output unit outputs a value, the value being obtained by adding a height change amount corresponding to atmospheric pressure difference calculated by the difference calculation unit to an output value of the absolute height at the previous output time point, as the absolute height of the moving body.

5. The height output device according to any one of claims 1 to 4, wherein
 in a case where the representing value of the signal intensity of the GPS signals is lower than the predetermined threshold value, the determination unit determines that the reliability of the GPS height is at a low level, and
 in a case where the reliability is determined to be at the low level, the output unit does not output the absolute height of the moving body.

6. A height output method performed by a height output device, the method comprising:
 calculating, by circuitry of the height output device, a GPS height of a moving body based on GPS signals;
 measuring, by the circuitry, atmospheric pressure;
 determining, by the circuitry, reliability of the GPS height that is calculated; and
 outputting, by the circuitry, a latest GPS height that is calculated, as an absolute value of the moving body in a case where the reliability that is determined satisfies a predetermined output reference, and outputting, by the circuitry, a height, the height being calculated by using a past output value of the absolute height and the atmospheric pressure that is measured, as the absolute height of the moving body in a case where the reliability that is determined does not satisfy the output reference.

7. A computer-readable medium having a program for allowing a computer that controls a height output device, the height output device including a GPS processing unit configured to calculate a GPS height of a moving body based on GPS signals and an atmospheric pressure measurement unit configured to measure atmospheric pressure, to function as a determination unit configured to determine reliability of the GPS height that is calculated by the GPS processing unit and an output unit configured to output an absolute height of the moving body depending on the reliability that is determined by the determination unit; wherein
 in a case where the reliability satisfies a predetermined output reference, the output unit outputs a latest GPS height that is calculated by the GPS processing unit, as an absolute height of the moving body, and in a case where the reliability does not satisfy the output reference, the output unit outputs a height, the height being calculated by using a past output value of the absolute height and the atmospheric pressure that is calculated by the atmospheric pressure measurement unit, as the absolute height of the moving body.

* * * * *